United States Patent [19]

Kumatani et al.

[11] Patent Number: 4,689,509
[45] Date of Patent: Aug. 25, 1987

[54] LOW INERTIA, SPEED VARIABLE INDUCTION MOTOR

[75] Inventors: Hiroshi Kumatani; Takashi Nakamura, both of Nagoya, Japan

[73] Assignee: Mitsubishi Denki Kabushiki Kaisha, Tokyo, Japan

[21] Appl. No.: 888,649

[22] Filed: Jul. 28, 1986

Related U.S. Application Data

[63] Continuation of Ser. No. 741,722, Jun. 6, 1985, abandoned, which is a continuation of Ser. No. 508,042, Jun. 27, 1983, abandoned.

[30] Foreign Application Priority Data

Jun. 30, 1982 [JP] Japan .................................. 57-98961
Jun. 30, 1982 [JP] Japan .................................. 57-98962

[51] Int. Cl.$^4$ .............................................. H02K 7/10
[52] U.S. Cl. ........................................ 310/77; 310/166; 310/266; 310/89
[58] Field of Search ................... 310/166, 266, 76–78, 310/89, 112–114

[56] References Cited

U.S. PATENT DOCUMENTS

| 2,482,840 | 9/1949 | Collins et al. | 310/77 X |
| 2,626,366 | 1/1953 | Stoner et al. | 310/114 |
| 2,653,256 | 9/1953 | Walley et al. | 310/76 |
| 2,653,257 | 9/1953 | Sailer | 310/266 X |
| 2,929,946 | 3/1960 | Aske | 310/166 X |
| 2,974,242 | 3/1961 | Apstein | |

Primary Examiner—Donovan F. Duggan
Attorney, Agent, or Firm—Oblon, Fisher, Spivak, McClelland & Maier

[57] ABSTRACT

A low inertia, speed variable induction motor comprises a frame, a stator fixedly placed in the frame, a yoke fixedly placed in the frame in opposition to the stator with a predetermined gap and a cup-shaped rotor which is inserted into the gap and is fixedly mounted on an output shaft supported in the frame in a freely rotatable manner. Rotating magnetic field is produced in the gap by the stator and the yoke to generate a rotational torque of the cup-shaped rotor. The cup-shaped rotor is formed of a material or materials having a hysteresis characteristic and an eddy current producing characteristic to obtain a large torque.

9 Claims, 3 Drawing Figures

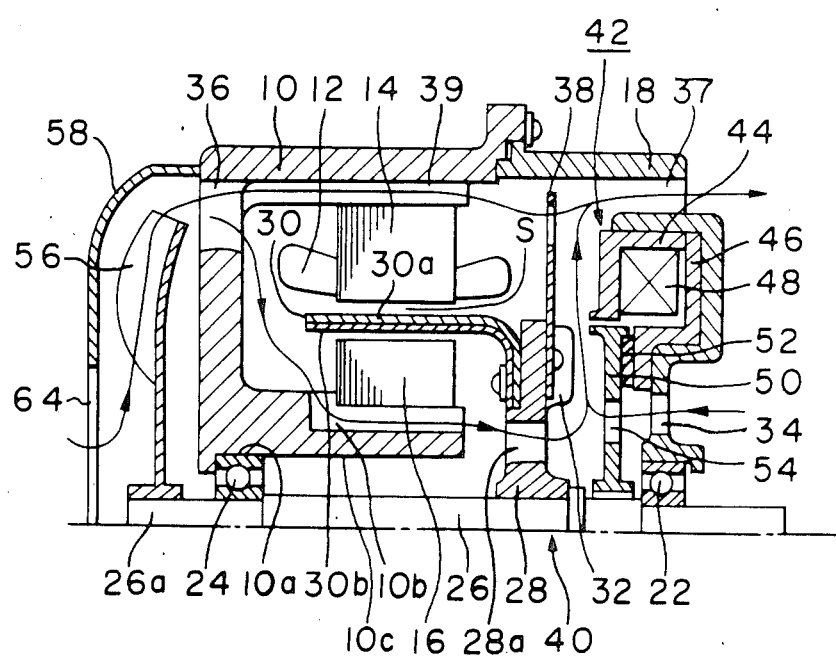

LOW INERTIA, SPEED VARIABLE INDUCTION MOTOR

This application is a continuation, of application Ser. No. 741,722, filed June 6, 1985, now abandoned, which is a continuation of application Ser. No. 508,042, filed June 27, 1983, now abandoned.

This invention relates to a low inertia, speed variable induction motor. More particularly, it is concerned with a low inertia, speed variable induction motor capable of rendering its rotational energy to be relatively low with respect to torque of the rotor.

In general, a servomotor for numerical control or a speed variable driving motor for industrial sewing machine is required to have a steep rising or trailing performance in its rotational speed.

At present, it has generally been admitted that the electric motor which is the most suitable for such use is a direct current electric motor to be driven by a thyristor-Leonard control pwer source. The reason for this is that the direct current electric motor is excellent in its controlling capability, and that is has a large starting torque and excellent speed response property, and others. However, such DC electric motor requires a permanent magnet, a commutator, a brush holder, and so froth. Further, it is not able to increase its rotational speed so high from the standpoint of its rectification characteristic, has a limit to reduction in its size and weight, and also requires maintenance against wear of the commutator brush.

In contrast to this, since the induction motor can be used without necessity for maintenance, it can replace the DC electric motor for the above-mentioned use to the full extend, provided that an inexpensive inverter control power source becomes available.

However, in the conventional speed variable induction motor, there remained a point of problem such that its rotational energy was still high with respect to the torque of the driving body, because a yoke which generates rotating magnetic field in cooperation with the stator was mounted on the rotor and a weight of the driving body including the rotor, and the yoke was relatively large, i.e., the driving body was constructed with component parts of large size and weight.

On account of this, the conventional induction motor had such disadvantages so that it could not be used in various machines and appliances such as, for example, sewing machine, etc. which are required to have excellent response properties such as a steep rising and trailing performance, etc., and, when such induction motor is forced to be used any way, the load of the machine and appliance such as sewing machine had to be driven through a particular device such as an electromagnetic joint device, etc.

The present invention has been made in view of the conventional problem as described in the preceding, and has its object in providing a low inertia, speed variable induction motor with its rotational energy being made relatively low with respect to the torque of the rotor, and having excellent response property such as steep rising and trailing performance and a simple construction.

According to the present invention, in general aspect of it, there is provided a low inertia, speed variable induction motor, characterized by comprising a stator fixedly provided in a frame; a yoke fixedly placed in the frame in opposition to the stator with a small gap between them; and a cup-shaped rotor which is formed of a material imparting a hysteresis characteristic and a material imparting an eddy current producing characteristic and which is fixedly mounted on an output shaft in a state of its being inserted in said gap in a freely rotatable manner.

The foregoing object, other objects as well as specific construction and function of the low inertia, speed variable induction motor according to the present invention will become more apparent and understandable from the following detailed description thereof, when read in conjunction with the accompanying drawing showing preferred embodiments of the invention.

In the drawing:

FIG. 3 is also a halved cross-sectional view showing the second preferred embodiment of the induction motor according to the present invention.

In the following, the present invention will be described in detail with reference to a couple of preferred embodiments thereof shown in the accompanying drawing.

Figure 1:
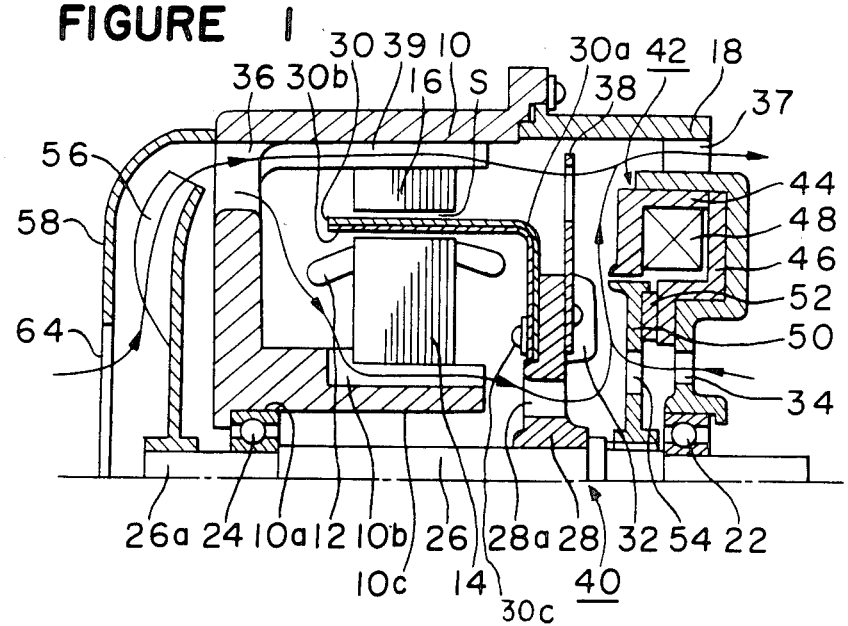
FIG. 1 is a halved cross-sectional view showing the first preferred embodiment of the induction motor according to the present invention.
Figure 2:
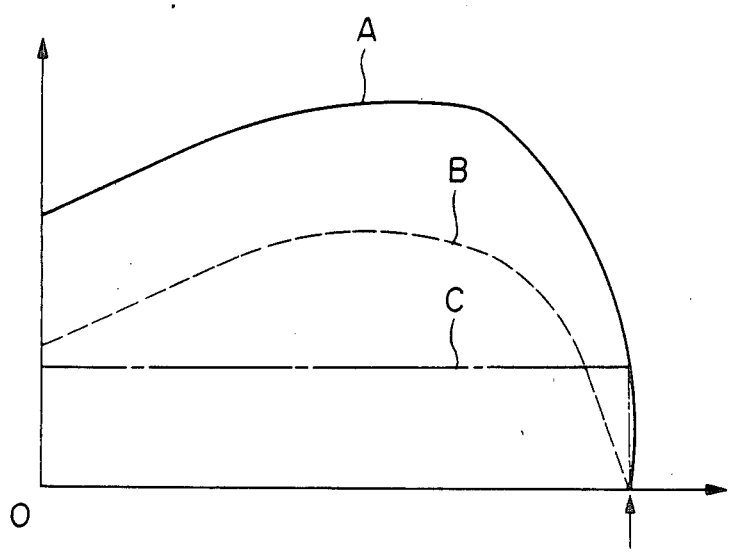
FIG. 2 is a diagram showing a torque characteristic of the induction motor shown in FIG. 1.

FIGS. 1 and 2 show the first preferred embodiment of the low inertia, speed variable induction motor according to the present invention. In the drawing, a stator 14 having a stotor winding 12 same as in an ordinary induction motor is fixed on the outer peripheral surface of the elongated cylindrical portion 10c formed at the center part of the inner side of the frame 10 for the electric motor. On the other hand, a yoke 16 made up of a laminated iron core is fixed on the inner surface of the outer peripheral wall of the frame 10 so as to face the stator 14 with a small gap S between them. Rotating magnetic field is formed in the gap S by the stator 14 and the yoke 16 due to conduction of electric current through the stator winding 12.

An output shaft 26 is axially supported in a freely rotatable manner on bearings 22, 24 which are respectively fixed in the rear part of a bracket 18 made of a non-magnetic member and connected to an opening of the frame 10 and in a perforation 10a formed at the center part of the frame 10. A rotor 30 having a cup-shape in cross section is fixed with screws 30c on the supporting stand 28 mounted on the output shaft 26, in a manner to be inserted into the abovementioned gap S. The cup-shaped rotor 30 is fabricated by superposing an eddy current producing plate 30a made of a non-magnetic and high electrically conductive material such as aluminum, copper, silver-copper alloy, and so forth and a hysteresis plate 30b made of a semihard magnetic material such as iron into a cup-like shape. With the rotating magnetic field formed by the stator 14 and the yoke 16, an eddy current is produced in the eddy current producing plate 30a while a magnetic polarity is produced in the hysteresis plate 30b whereby a driving torque is produced with linkage of the rotating magnetic field and the eddy current as well as action of the rotating magnetic field and the magnetic polarity.

There are provided on the one side surface of the supporting stand 28 cooling fans 32 regularly in the radial direction to cool the interior of the electric motor. In the inner peripheral side of the cooling fan 32, there is formed a hole 28a to be an air passageway for the cooling air. By rotation of the cooling fan 32, the cooling air from the suction port 34 formed in the bracket 18 is introduced into the motor interior, and then it is discharged from the discharging port 37 formed in the bracket 18 as shown by the arrow mark in FIG. 1. The cooling air is also let in through the suction port 36 formed in the side wall of the frame 10 by the rotation of the cooling fan 32. This cooling air passes through a part 10b, where fins are formed to cool it, which is provided in the outer surface of the elongated cylindrical portion 10c formed at the center part of the inner side of the frame 10 as shown by the arrow mark in FIG. 1, then goes through the hole 28a formed in the supporting stand 28 to the center side of it, and discharged through the discharge port 37 formed in the bracket 18.

A heat discharging fin 38 in a disc-shape is mounted on the supporting stand 28, and heat generated in the cup-shaped rotor 30 is dissipated from the heat-discharging fin 38. The supporting stand 28 is made of a material such as, for example, aluminum which has good heat-conductivity so that heat generated in the cup-shaped rotor 30 may be quickly dissipated, and also which has good electric conductivity so that it may provide a large torque in a low slipping condition as an end ring of the eddy current producing plate 30a. In addition, at a salient part 26a in the left directions of the output shaft 26, as shown in FIG. 1, there is fixedly provided a cooling fan 56 of a larger size so as to effect more cooling of the interior of the electric motor. The cooling fan 56, introduces cooling air through a suction port 64 formed in a fan cover 58, causes it to pass through the suction port 36 formed in the frame 10 and the part 39 to be cooled, which is provided with fins, and discharges it through the discharge port 37 formed in the bracket 18.

There is further mounted on the output shaft 26 an electromagnetic brake means 42 to control the rotational movement of the driving body 40 inclusive of the above-mentioned supporting stand 28 and the cup-shaped rotor 30. The electromagnetic brake means 42 is in a construction to be mentioned in the following.

That is to say, iron core parts 44, 46 of the electromagnetic brake means 42 is supported on the bracket 18 made of a non-magnetic material. Inside the iron core part 44, there is received and held therein a brake winding 48 which is for introducing magnetic flux to these iron core parts 44, 46. And, on the output shaft 26, a brake disc 50 is mounted in its axial direction in a freely movable manner. This brake disc 50 is constantly energized elastically in the leftward direction by a spring (not shown) so as to be away from the iron core part 46 in FIG. 1. On the surface opposite to the iron core part 46 of the brake disc 50, there is fixedly secured a brake pad 52. With frictional force between the brake pad 52 and the iron core part 46, quick stoppage of the output shaft 26 can be effected. Incidentally, a vent hole 54 is formed in the brake disc 50, which is for leading the cooling air sucked in through the above-mentioned suction port 34 into the inner part of the electric motor.

In the following, explanations will be given as to the operations of the induction motor according to the present invention in its first embodiment of the construction as described in the foregoing.

On energization of the stator winding 12, a rotating magnetic field is introduced into the gap S by the cooperative action between the stator 14 and the yoke 16. An eddy current is produced in the eddy current producing plate 30a by the rotating magnetic field and the eddy current crosses a magnetic flux to generate a rotational torque as shown by dotted line B in FIG. 2. A magnetic polarity is produced in the hysteresis plate 30b by the rotating magnetic field and thus formed magnetic polarity cooperates with the rotating magnetic field to generate a rotational torque as shown by the one dotted chain line C in FIG. 2.

As a result, a composed torque is of a driving torque characteristic, as shown in the solid line A in FIG. 2, which is not attainable by only the eddy current producing plate 30a or the hysteresis plate 30b. The driving torque can be obtained as a mechanical rotational output through the output shaft 26 which is the axial core for the cup-shaped rotor 30. At the start of rotation of the motor as mentioned above, since the driving body 40 of the electric motor is constructed, as a low inertial driving body, with the structural members of reduced size and weight including the supporting stand 28 mounted on the supporting stand 26 and the cup-shaped rotor 30 mounted on the supporting stand 28, the motor has excellent response properties such as steep rising and trailing performance, and others. In other words, the conventional induction motor was of such a construction that the driving body thereof had the rotor and the yoke as an integral part, while the induction motor according to the present invention is of such a construction that the cup-shaped rotor 30 is made independent from the yoke 16 so as to form the driving body with the structural component members of reduced size and weight inclusive of the cup-shaped rotor 30 and the supporting stand 28 to support the same. in addition, since the cup-shaped rotor 30 is extended in the axial direction, the motor can be reduced its size in the diametrical direction, and, at the same time, a wide surface area can be taken for generating the eddy current and the magnetic polarity. In this embodiment, the yode 16 is fixed on the inner surface of the outer peripheral wall of the frame 10. Accordingly, the gap S can be provided at a diametrically outer position in comparison with the case that the stator 14 is fixed on the outer peripheral surface of the inner side of the frame 10 whereby a greater driving torque can be obtained.

Such induction motor as mentioned in the preceding is highly suitable as the servomotor for numerical control which is required to have steep rising and trailing performance, or as a speed variable driving motor for industrial sewing machine. The motor is capable of performing abrupt start and stop easily and efficiently.

Also, braking of the driving body 40 is done by adjustment of electric current flowing through the stator winding 12 and the brake winding 48. For example, when the load such as sewing machine, etc. connected with the output shaft 26 is to be stopped abruptly, the current flowing through the stator winding 12 is interrupted, and, at the same time, the current is caused to flow through the brake winding 48 of the electromagnetic brake 42, thereby actuating the electromagnetic brake 42. That is to say, by the current flow through the brake winding 48, there is produced the magnetic flux which passes through the iron core parts 44, 46 and the brake disc 50, and the brake disc 50 is attracted to the iron core part 46. As the result, the output shaft 26 quickly stops its rotation by the friction between the brake pad 52 and the iron core part 46.

When the electric current is caused to flow through the brake winding 48 as mentioned above, there is produced the magnetic flux in the iron core parts 44, 46 and the brake disc 50. However, since the bracket 18 to support the iron core parts 44, 46 is made of a nonmagnetic material, there is no possibility of generation of the leakage magnetic flux extending from the iron core part 46 to the brake disc 50 through the bracket 18 and the bearing 22. Accoringly, there is no possibility of the above-mentioned leakage magnetic flux passing through the bearing 22 which is in the rotating condition, hence the bearing 22 is prevented from damage due to heat generated therein by the eddy current.

Subsequently, the motor itself is brought to a state of heat generation due to driving of the motor. In this case, cooling air is introduced from outside of the motor through the air suction ports 64, 34 and 36 by rotation of the cooling fan 32 provided on the supporting stand 28, and the cooling fan 56 fixedly provided on the output shaft 26, as shown by the arrow mark in FIG. 1, and the air after cooling the motor is discharged outside through the discharge port 37, whereby the temperature increase in the interior of the electric motor can be effectively prevented.

Further, since the heat discharging fin 38 is fixedly provided on the cup-shaped rotor 30, the heat from the cup-shaped rotor in its heated condition is transmitted to the heat-discharging fin 38 which is cooled by the cooling air, whereby the cup-shaped rotor 30 and the supporting stand 28 supporting the same can be sufficiently cooled.

FIG. 3 shows the second preferred embodiment of the present invention. The construction of this embodiment is the same as the first embodiment, provided that a yoke 16 and a stator 14 are placed in the opposite positional relationship. Namely, the stator 14 is fixedly on the inner surface of the outer peripheral wall of the frame 10 and the yoke 16 is fixed on the outer peripheral surface of the elongated cylindrical portion 10c formed at the center part of the frame 10 so as to face the stator 14 with a small gap S.

In the induction motor of the second embodiment having the construction above-mentioned, when the stator winding 12 is energized, a rotating magnetic field is introduced into the gap S by the cooperative action between the stator 14 and the yoke 16. The rotating magnetic field produces an eddy current in the eddy current producing plate 30a and the eddy current crosses a magnetic flux to generate a rotational torque same as that shown by the dotted line B in FIG. 2. A magnetic polarity is produced in the hysteresis plate 30b by the rotating magnetic field. The magnetic polarity cooperates with the rotating magnetic field to generate a rotational torque same as that shown by the one dotted chain line C in FIG. 2.

A torque composed of the torque resulted by the cooperation of the eddy current and the magnetic flux and the torque resulted by cooperation of the magnetic polarity and the rotating magnetic field is of one having the characteristic same as that shown by the solid line A in FIG. 2. The resultant torque can not be obtained by only the eddy current producing plate or the hysteresis plate.

In the first and second embodiments, the cup-shaped rotor 30 is formed of each single plate of the eddy current producing plate 30a and the hysteresis plate 30b. It is, however, possible to use a sandwiched structure of each plural number of plates. Furthermore, it is alos possible to use a single plate made of a material having both eddy current producing characteristic and hysteresis characteristic.

We claim:

1. A low inertia, variable speed A.C. induction motor comprising:
    a frame;
    a bracket connected to an opening in said frame and made of a nonmagnetic material;
    a stator fixedly placed in said frame;
    a freely rotatable output shaft placed in said frame;
    a cup-shaped rotor fixedly mounted on said output shaft formed of a material imparting a hysteresis characteristic and a material imparting an eddy current producing characteristic;
    a yoke fixedly placed in said frame in opposition to said stator having a small gap between them and said up-shaped rotor;
    an electromagnetic brake means supported by said bracket attached to said output shaft for braking the rotational movement of said shaft, and d.c. current supplying means coupled to said electromagnetic brake means for providing d.c. current to said braking means.

2. An induction motor according to claim 1 wherein said cup-shaped rotor is formed by superposing one or more cup-shaped plates each imparting hysteresis characteristic and eddy current producing chracteristic.

3. An induction motor according to claim 1 wherein said cup-shaped rotor is formed of a single material having both a hysteresis characteristic and an eddy current producing chracteristic.

4. An induction motor according to claim 1 wherein said output shaft is placed extending into the center part of said frame and is supported by the frame in a freely rotatable manner and said cup-shaped rotor is fixed to said output shaft at its center part.

5. An induction motor according to claim 1 wherein said yoke is fixdly placed on the inner surface of the outer peripheral wall of said frame and said stator is fixedly placed on the outer peripheral surface of the inner central part of said frame so as to face said yoke with a small gap.

6. An induction motor according to claim 5 wherein said stator is fixedly placed on the outer peripheral surface of the elongated cylindrical portion formed at the center part of the inner side of said frame.

7. An induction motor according to claim 1 wherein said stator is fixedly placed on the inner surface of the outer peripheral wall of said frame and said yoke is fixedly placed on the outer peripheral surface of the inner central part of said frame so as to face said stator with a small gap.

8. An induction motor according to claim 7 wherein said yoke is fixedly placed on the outer peripheral surface of the elongated cylindrical portion formed at the center part of the inner side of said frame.

* * * * *